United States Patent [19]

Schwiers et al.

[11] 4,349,991
[45] Sep. 21, 1982

[54] CLOSING DEVICE FOR LARGE PASSAGES IN A PRESTRESSED PRESSURE VESSEL

[75] Inventors: Hans-Georg Schwiers, Ketsch; Josef Schoening, Hambruecken, both of Fed. Rep. of Germany

[73] Assignee: Hochtemperatur-Reaktorbau GmbH, Cologne, Fed. Rep. of Germany

[21] Appl. No.: 125,708

[22] Filed: Feb. 28, 1980

[30] Foreign Application Priority Data

Mar. 7, 1979 [DE] Fed. Rep. of Germany ....... 2908969

[51] Int. Cl.³ .............................................. E04C 3/10
[52] U.S. Cl. ........................................ 52/21; 52/224; 220/315; 220/3; 264/34
[58] Field of Search .................................... 52/19–21, 52/224; 220/315, 3; 264/34

[56] References Cited

U.S. PATENT DOCUMENTS

| | | | |
|---|---|---|---|
| 2,873,505 | 2/1959 | Sheldon | 264/34 |
| 3,161,703 | 12/1964 | Watson | 264/31 |
| 3,252,199 | 5/1966 | Bössner | 264/34 |
| 3,353,859 | 11/1967 | Schupack | 52/224 |
| 3,389,516 | 6/1968 | Ziegler | 52/224 |
| 3,568,379 | 3/1971 | Johnsson | 220/315 |
| 3,693,822 | 9/1972 | Thillet | 220/3 |
| 3,863,410 | 2/1975 | Dorner | 220/3 |
| 3,910,447 | 10/1975 | Bevilacqua | 220/3 |
| 4,138,030 | 2/1979 | Andersson | 220/3 |
| 4,192,717 | 3/1980 | Gross | 220/315 |

FOREIGN PATENT DOCUMENTS

| | | | |
|---|---|---|---|
| 485768 | 11/1929 | Fed. Rep. of Germany | 220/3 |
| 197712 | 12/1977 | U.S.S.R. | 220/3 |

Primary Examiner—Price C. Faw, Jr.
Assistant Examiner—Henry E. Raduazo
Attorney, Agent, or Firm—Schwartz, Jeffery, Schwaab, Mack, Blumenthal & Koch

[57] ABSTRACT

Disclosed is a closing arrangement for large passages in a prestressed pressure vessel comprising a cover means for covering the opening of a passage in the prestressed pressure vessel, an annular structural part having an inner boundary surface surrounding the covering means at a distance and defining a space therebetween, a means for securing the annular structural part to the prestressed pressure vessel and a plurality of connecting elements disposed in the space between the annular structural part and the covering means in abutting relationship with the inner boundary surface of the annular structural part and the covering means.

9 Claims, 2 Drawing Figures

CLOSING DEVICE FOR LARGE PASSAGES IN A PRESTRESSED PRESSURE VESSEL

BACKGROUND OF THE INVENTION

1. Field of the Invention

The invention relates to a closing device for large passages, cavities or chambers in a prestressed pressure vessel. More particularly, the closing device safely seals areas housing components of nuclear power plants. The basic element of the device is a cover, narrowing entirely or partially in the upward direction and resting on the edge of the passage, cavity or chamber.

2. Background of the Prior Art

Certain components of nuclear power plants, such as for example heat exchangers, must be readily accessible for purposes of repair or replacement and are, therefore, housed within a prestressed pressure vessel in large passages. These passages must be adequately sealed and shielded during the normal operation of the reactor. Usually, closing devices of concrete, steel or cast iron are used for the purpose. These closing devices must withstand the high internal pressures in the vessel. The pressure vessel itself usually consists of a prestressed structure of concrete, steel or cast iron.

A closing device of this type is known, for example, from West German Offenlegungsschrift 27 10 859. It consists of a pressure-bearing, reinforced concrete body held by vertical prestressing members of the pressure vessel and an elastic sealing cover made of steel. By means of the vertical prestressing elements which may pass through the pressure-bearing, reinforced concrete body itself, the reinforced concrete body is pressured onto the sealing cover and the cover, with its flange, onto the liner arranged in the passage.

In West German Offenlegungsschrift No. 17 84 369, a closing device for a manhole opening in the wall of a reinforced concrete pressure vessel is disclosed. The reinforced concrete part comprises an annular outer part and an inner part. Both parts have circumferential prestressing and the annular outer part additionally is provided with channels to receive vertical prestressing elements which are also passed through the reinforced concrete pressure vessel. A projection protrudes from the outer circumference, which cooperates with a correspondingly shaped projection on the outer part. To remove the closing device, both parts must be dismantled, i.e. it is necessary to release the prestressing elements passing through the pressure vessel and the outer part.

Another arrangement for sealing an opening in a pressure vessel is shown in West German Offenlegungsschrift No. 16 84 926. It comprises a cover consisting of reinforced concrete with a conical outer boundary surface and a plurality of wedge-like abutments, whereby the cover is supported on the mantle of the pressure vessel. The closing device in this instance is not set on the opening in the vessel, but is inserted from above in the opening. The cover is designed in several pieces and clamped together by clamping elements from several sectors.

In West German Offenlegungsschrift No. 22 34 491 again a closing device for a passage in a pressure vessel is described. The closing device consists of concrete and is inserted from above into the passage. Prestressing is induced in the closing device by means of compressive stress acting upon its circumference. In order to secure the closing device against axial forces and to transfer such forces, a primary retaining device is provided, whereby the closing device is supported on a flange of the passage liner.

The retaining device consists of a plurality of segments, designed to form together a truncated cone-shaped annulus. By means of a secondary retaining device, the closing device is to be secured in case of a failure of the primary retaining device. The secondary retaining device comprises a series of elements fastened in part to the circumference of the closing device and in part to the passage liner and brought into engagement with each other. They may be released at least in part from each other in order to render possible the removal of the closing device.

The present invention is based on this state of the art, wherein it has as its object to provide a closing device for large passages of the above-described design type. The closing device of this invention is to be characterized by a high degree of safety, economical manufacture and handling and ready dismantling of the cover.

SUMMARY OF THE INVENTION

According to the present invention, the above objects and advantages are attained by an arrangement comprising an annular structural part surrounding a cover member at a distance and set upon the prestressed pressure vessel. The inner boundary surface of the annular structural part forms a positive seal with the cover by means of a plurality of connecting elements provided in a space between the cover and the annular structural part, wherein the positively sealing connecting elements hold the cover in position. The annular structural part is anchored by appropriate means in the prestressed pressure vessel. A redundant anchoring means is preferred for reasons of safety.

The inner boundary surface of the annular structural part may, for example, be conical to the same degree as the cover and the dimensions of the annular structural part are determined so that it has a larger diameter at its upper rim than the cover diameter possesses at its lower rim.

The cover is securely held in its position by the positively-sealing connecting elements resting both against the cover and the inner boundary surface of the annular structural part. The connecting elements are in turn immobilized by resting against the redundantly-anchored annular structural part. Due to this arrangement, the cover may be put in place and removed without it being necessary to release the anchoring of the annular structural part. This provides for a simple and rapid handling of the closing device according to the invention. The necessary degree of safety is assured by the redundancy of the anchoring of the annular structural part.

In a highly advantageous manner, the annular structural part is held firstly by one or more vertical prestressing cables of the prestressed pressure vessel. As a second securing means, an anchoring structure comprising parts cast into the material of the prestressed pressure vessel and into the material of the annular structural part. The cast-in parts may conveniently consist of armored anchoring shields. Because the cover may be removed without releasing the anchoring of the annular structural part, it is not necessary to release the prestressing cables and the prestressing of the pressure vessel remains in full force.

The annular structural part may also be made an integral part of the prestressed pressure vessel, which has the advantage that the dimensions of the closing device according to the invention may be kept relatively compact. A further advantage of the invention consists of the fact that the positively-sealing connecting elements may be designed as prestressing elements, whereby the closing device may withstand larger loads because the cover may be prestressed radially with the aid of these prestressing elements.

Another possibility to increase the load bearing capacity of the closing device according to the invention consist of additionally anchoring the cover in the prestressed pressure vessel. This may be effected, for example, with the aid of prestressing elements having their lower ends designed as anchors and removably set in the upper area of the prestressed pressure vessel.

DETAILED DESCRIPTION OF THE PREFERRED EMBODIMENTS

Figure 1:
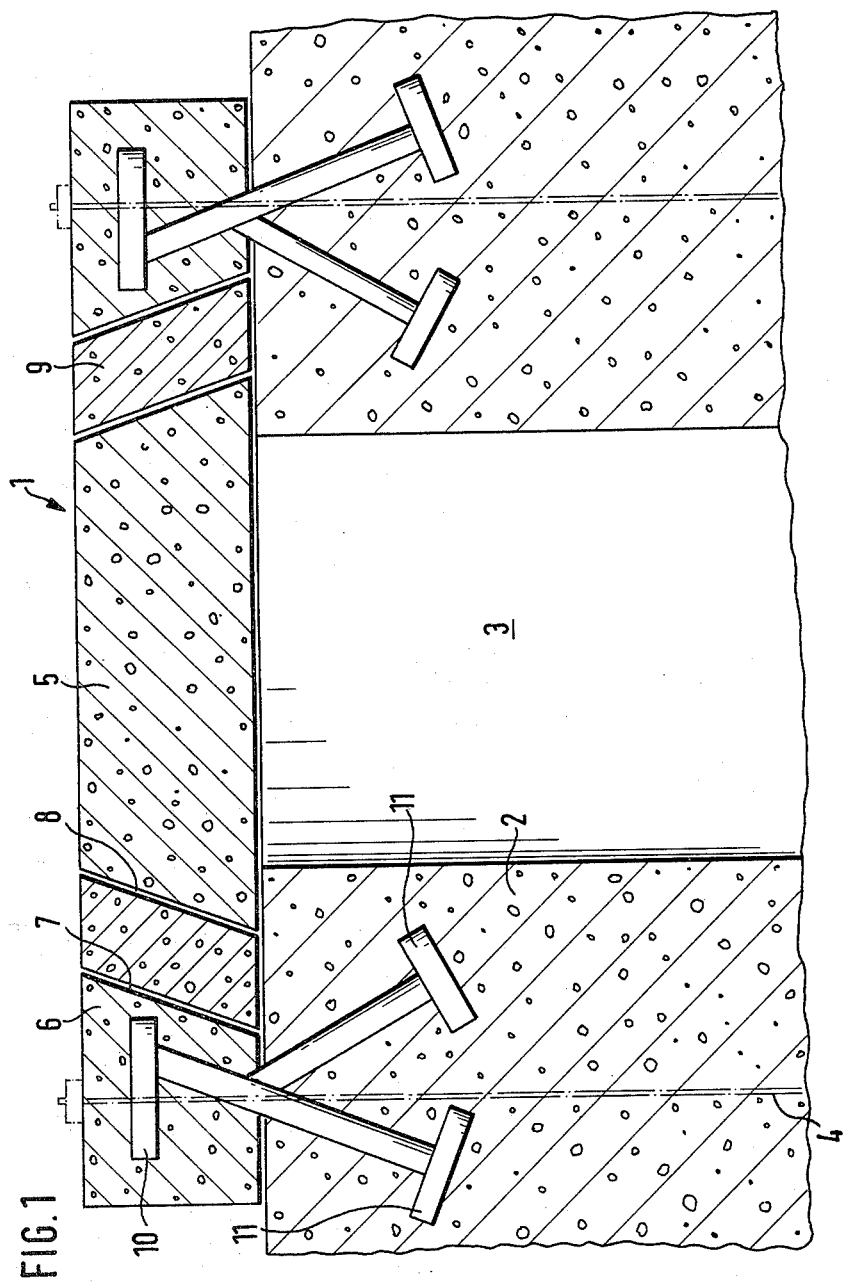
FIG. 1 discloses a longitudinal section through a first preferred embodiment of the invention.

FIG. 1 shows a closing device 1 for a large passage 3 which is formed in the reinforced concrete pressure vessel 2. In the passage 3, a component of a high temperature nuclear reactor, for example, a heat exchanger, a steam generator, a recuperator, a precooler or the like may be arranged (not shown). The prestressing of the pressure vessel 2 in the direction of its longitudinal axis is accomplished by means of vertical prestressing cables. Only one such prestress cable 4 is shown in the drawings.

The essential component of the closing device 1 comprises a cover 5 of concrete, resting upon the upper rim of the passage 3 and narrowing in the upward direction, i.e. it is in the shape of a truncated cone. An annular structural part 6, also of reinforced concrete, rests upon the reinforced concrete pressure vessel 2 so that it surrounds the reinforced concrete cover 5 at a distance. The inner boundary surface 7 of the structural part 6 is conical in shape and correspondingly adapted to the mantle surface of the concrete cover 5.

The distance between the concrete cover 5 and the annular structural part 6 is determined so that annular structural part 6 has at its upper rim a larger diameter than the concrete cover 5 at its lower rim. This, of course, enables the easy removal of the concrete cover.

Within the annular space 8 defined by the concrete cover 5 and the annular structural part 6, a plurality of connecting elements 9 are arranged. These connecting elements rest positively against and between the structural part 6 and the concrete cover 5. These connecting elements secure the concrete cover 5 in its position on the passage 3 and are being held in turn by the annular structual part 6. The annular structural part 6 is anchored in the reinforced concrete pressure vessel 2 by appropriate means. In FIG. 1 a redundant anchoring means is disclosed.

The redundant anchoring of the annular structural part 6 is effected firstly by the vertical prestressing cables 4 passing through the annular structural part 6 and secondly by means of armored anchoring shields 10 and 11. The anchoring shield 10 is cast into the structural part 6 and the anchoring shield 11 is cast into the reinforced concrete pressure vessel 2.

Following the removal of the connecting elements 9 the concrete cover 5 may be taken off without the need for additional measures from the passage 3. It is thus not necessary to release the prestressing cables 4. There is, therefore, no change in the prestressing of the reinforced concrete pressure vessel 2.

Figure 2:
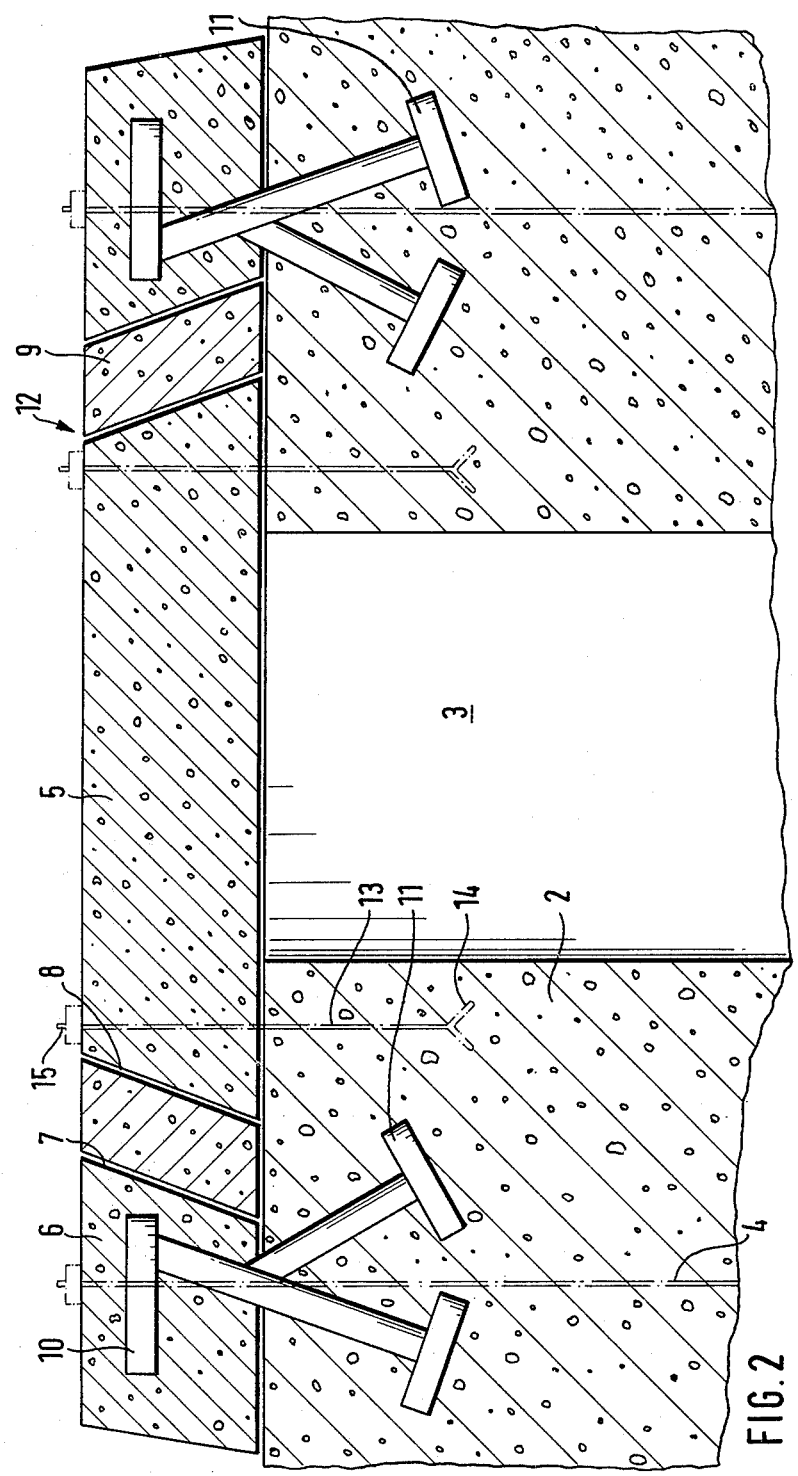
FIG. 2 depicts a longitudinal section through a second preferred embodiment.

FIG. 2 shows a closing device 12 which is very similar to that shown in FIG. 1. The common individual details are thus designated with the same reference numbers. In this closing device of FIG. 2, the concrete cover 5 is additionally held by means of prestressing elements 13. The lower ends of the prestressing elements 13 are equipped with anchors 14. The anchors 14 are cemented into the upper area of the reinforced concrete pressure vessel 2. To remove the concrete cover, the prestressing elements 13 may be released at the stress points 15. Any well known releasible stress members may be employed at stress point 15.

The connecting elements may individually also take a form in a preferred embodiment substantially identical with well known connecting, abutting or locking rings or elements. An example of such abutting or locking means is described in West German Offenlegungschrift No. 16 84 926 mentioned in the foregoing prior art section and British Pat. No. 1,358,481. The pertinent portions of the disclosures of both of these references are incorporated herein.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

What is claimed is:

1. A closing arrangement for large passages in a prestressed pressure vessel comprising:

a cover means for covering the opening of a passage in said prestressed pressure vessel;

an annular structural part having an inner boundary surface surrounding said covering means at a distance and defining a space therebetween said part comprising concrete;

a means for securing said annular structural part to said prestressed pressure vessel, said securing means including a plurality of prestressing cables extending from said pressure vessel through said annular structural part and a plurality of anchor members cast into said pressure vessel and annular structural part, and a plurality of connecting elements disposed in said space between said annular structural part and said covering means in abutting relationship with said inner boundary surface of said annular structural part and said covering means.

2. The closing arrangement of claim 1 wherein said cover means comprises a concrete cover.

3. The closing arrangement of claim 2 wherein said cover is in the shape of a truncated cone.

4. The closing arrangement of claim 3 wherein said passage is of a cylindrical shape formed in a prestressed concrete pressure vessel, said cover is of a larger diameter than said passage at least at its lower surface and rests on the upper circumferential rim of said passage.

5. The closing arrangement of claim 4 wherein said inner boundary surface of said annular structural part has a diameter larger at its lower rim than its diameter at its upper rim, said inner boundary surface having a slope inverse to that of said cover.

6. The closing arrangement of claim 5 wherein said anchor members comprise armored anchoring shields.

7. The closing arrangement of claims 1 or 5, wherein said annular structural part is integrated into said prestressed pressure vessel.

8. The closing arrangement of claims 1 or 5 wherein said connecting elements take the form of prestressing elements.

9. The closing arrangement of claims 1 or 5 wherein said cover means is anchored by releasible prestressing elements anchored in said prestressed pressure vessel.

* * * * *